(12) United States Patent
Javadekar (10) Patent No.: US 11,275,573 B1
(45) Date of Patent: Mar. 15, 2022

(54) INTELLIGENT ROLLING UPDATE OF A CLUSTER OF SERVERS VIA CONTAINER ORCHESTRATION

(71) Applicant: Intuit Inc., Mountain View, CA (US)

(72) Inventor: Shrinand Suresh Javadekar, Mountain View, CA (US)

(73) Assignee: Intuit Inc., Mountain View, CA (US)

(*) Notice: Subject to any disclaimer, the term of this patent is extended or adjusted under 35 U.S.C. 154(b) by 111 days.

(21) Appl. No.: 16/526,944

(22) Filed: Jul. 30, 2019

(51) Int. Cl.
*G06F 8/65* (2018.01)
*G06F 16/955* (2019.01)
*G06F 9/455* (2018.01)
*G06F 16/903* (2019.01)

(52) U.S. Cl.
CPC ............ *G06F 8/65* (2013.01); *G06F 9/45558* (2013.01); *G06F 16/903* (2019.01); *G06F 16/955* (2019.01); *G06F 2009/45595* (2013.01)

(58) Field of Classification Search
CPC ........ G06F 8/65; G06F 16/903; G06F 16/955; G06F 9/45558; G06F 2009/45595; G06F 8/71; H04L 67/34; H04L 67/10; H04L 67/38; H04L 67/12; A63F 13/355; A63F 13/69; A63F 13/35
See application file for complete search history.

(56) References Cited

U.S. PATENT DOCUMENTS

| | | | |
|---|---|---|---|
| 2006/0053216 A1* | 3/2006 | Deokar | H04L 41/042 709/223 |
| 2013/0198719 A1* | 8/2013 | Raman | G06F 8/61 717/121 |
| 2014/0304398 A1* | 10/2014 | Carlen | G06F 9/54 709/224 |
| 2017/0169059 A1* | 6/2017 | Horowitz | H04L 9/0891 |
| 2017/0223075 A1* | 8/2017 | Hong | G06F 8/65 |
| 2018/0189050 A1* | 7/2018 | Salapura | G06F 8/65 |
| 2019/0220271 A1* | 7/2019 | Olderdissen | G06F 8/654 |

OTHER PUBLICATIONS

Sumo Logic; What is a Docker Swarm?; Sumo Logic; 21 pages; retrieved on Jul. 15, 2021 (Year: 2021).*
Vincent Gramoli et al.; Rollup Non-Disruptive Rolling Upgrade with Fast Consensus-Based Dynamic Reconfigurations; IEEE; pp. 2711-2724; retrieved on Oct. 13, 2021 (Year: 2016).*
Luis Pina et al.; Mvedsua Higher Availability Dynamic Software Updates via Multi-Version Execution; ASPLOS; pp. 573-585; retrieved on Oct. 13, 2021. (Year: 2019).*

* cited by examiner

*Primary Examiner* — S. Sough
*Assistant Examiner* — Cuong V Luu
(74) *Attorney, Agent, or Firm* — DLA Piper LLP (US)

(57) ABSTRACT

A method for automatically updating a plurality of brokers in a cluster of a distributed streaming platform within a container orchestration tool, the method including querying each of a plurality of brokers to obtain metadata from a distributed streaming platform; using the obtained metadata to identify a broker within the plurality of brokers that acts as a controlling broker; computing an order in which the plurality of brokers will be updated based on the obtained metadata, wherein the order specifies that the controlling broker will be updated last; and performing, via an update manager executed by at least one processor, a rolling update of each of the plurality of brokers according to the computed order.

19 Claims, 8 Drawing Sheets

INTELLIGENT ROLLING UPDATE OF A CLUSTER OF SERVERS VIA CONTAINER ORCHESTRATION

BACKGROUND

An emerging technology in computing is container orchestration; in other words, a platform for providing an enterprise-level framework for automating application deployment, scaling, scheduling, and management of containerized workloads. Containers are the building blocks of software packages and have become a standard way to package software and its dependencies. The enterprise-level framework, or container orchestration tool (e.g. Kubernetes®, Docker Swarm®, etc.) may deploy clusters of servers in an ordered, scalable manner. It also may be open-source.

In some instances, it may be desired to use this platform to manage the containers of a distributed event streaming platform (e.g. Kafka). The containers of the streaming platform are stored in brokers (servers), which operate together in clusters or groups, and the platform manages the clusters and its brokers. Kafka enables different containers in a cluster to pass messages or data to each other in a reliable, asynchronous way. A publisher container may write a message or specify data in a certain "topic" within Kafka, and other containers that have subscribed to that "topic" will receive that message or data.

Running the streaming platform with an orchestration tool (e.g. running Kafka on Kubernetes) is a promising architecture because it brings together the ability for multiple containers to share messages and/or data using Kafka, as the actual orchestration and control of the running containers is managed efficiently using Kubernetes. Kubernetes provides guarantees of running all containers in a cluster reliably and scalably, including the Kafka containers themselves. Once Kafka is running on Kuberentes, it makes sure that the messages and/or data subscription functionalities to certain topics work efficiently. Through an interface, a user may use the platform to manage the brokers by specifying parameters such as memory and storage allocations, the number of clusters per region, the number of clusters per host, etc. The user may also specify which containers they desire to be run. The platform will then automatically determine which clusters are best suited to run the containers.

Additionally, the platform may allow for automatic updating of the brokers within a cluster. Updates may be needed for various reasons, including, but not limited to, configuration updates, version upgrades, or standard cluster maintenance. A common way of updating a cluster of brokers is through a rolling update. During a rolling update, in order to prevent downtime of the cluster, only a single broker is updated at a time. The subsequent broker isn't updated until the previous has been updated, resumed operation, and is once again in sync with the rest of the cluster. However, applying rolling updates to these brokers when they operate within a container orchestration tool may yield some performance problems.

In a typical Kafka cluster of brokers, one of the brokers is designated as a controlling broker. This broker is in charge of managing partitions for replicas of topics, reassigning partitions, and other tasks. Any broker in the cluster may be a controller, meaning the assignment is more or less random. In the case that a controller is terminated or stops operating, a different broker from the remaining ones still operating will be selected to be the new controller.

When Kafka is running on Kubernetes®, the brokers within a cluster have their identities recorded and stored in a StatefulSet on Kubernetes®. A StatefulSet is a type of controller within Kubernetes® (note this is different than the controlling broker as described above) that manages the deployment of updates to and the scaling of pods (a group of one or more containers), while also providing guarantees about the ordering and uniqueness of each pod. The StatefulSet maintains identifiers across any rescheduling or processing.

When a rolling update is applied to a cluster, each broker in the cluster is updated. The StatefulSet will update each broker in the order defined by Kubernetes by terminating and then restarting each broker, repeating this until all brokers have been updated.

However, as mentioned above, in the case that a controller is terminated, a different broker from the remaining brokers within the cluster is selected as the new controller. This may cause serious problems during a rolling update. When the update reaches the controller, the controller must be terminated, meaning a new controller must then be selected from the remaining operating brokers, slowing performance. Due to the randomness of the selection, it is possible that the newly selected controller is the broker that is next in line to be terminated. This would lead to another reselection of the controller and thus another slowing of performance. In the worst case scenario, a cascaded effect of multiple consecutive reselections of controllers could occur. This may cause seriously degraded performance over an extended period of time as the system is repeatedly waiting on a new controller to be selected.

DETAILED DESCRIPTION OF SEVERAL EMBODIMENTS

Some embodiments described herein may make the automatic rolling update configurable. According to some embodiments of the present disclosure, an algorithm may consider the order specified by the StatefulSet and the identity of the controller to determine a rolling update order such that the controller is terminated last. This may minimize disruption within the process by guaranteeing a single reselection of the controlling broker during the rolling update.

Figure 1:
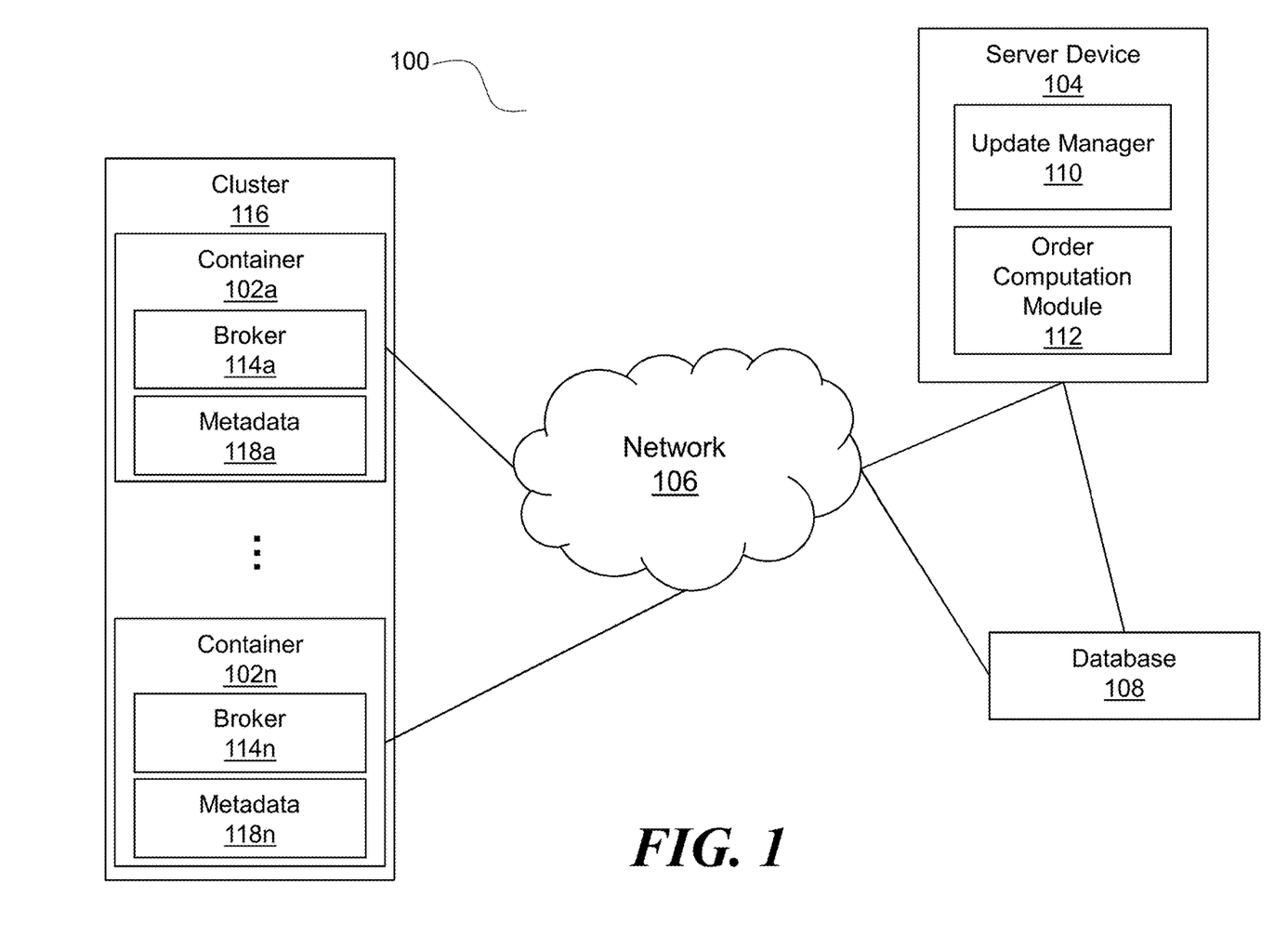
FIG. 1 is a block diagram of an example system for performing intelligent rolling updates to a cluster of servers, according to some embodiments of the present disclosure.

FIG. 1 is a block diagram of an example system 100 for performing intelligent rolling updates on a cluster 116 of containers 102 within a container orchestration tool, according to some embodiments of the present disclosure. System 100 may include a database 108 and one or more containers 102a, 102n . . . (102 generally) within a cluster 116 communicably coupled to server device 104 via a network 106.

Server device 104 may include any combination of one or more of web servers, mainframe computers, general-purpose computers, personal computers, or other types of computing devices. Server device 104 may represent distributed servers that may be remotely located and communicate over a communications network, and/or over a dedicated network such as a local area network (LAN). Server device 104 may also include one or more back-end servers for carrying out one or more aspects of the present disclosure. In some embodiments, server device 104 may be the same as or similar to device 600 described below in the context of FIG. 5.

As shown in FIG. 1, server device 104 may include update manager 110. Update manager 110 may be configured to perform intelligent rolling updates of a cluster 116 of containers 102. In some embodiments, update manager 110 may be configured to query the containers 102 via network 106 to obtain metadata 118. Metadata 118 may include priority data for containers 102. In some embodiments, update manager 110 may be configured to send metadata 118 obtained from the containers 102 to order computation module 112. Update manager 110 may also be configured to receive a computed order from order computation module 112, specifying the order in which the brokers should be updated. In some embodiments, order computation module 112 may be configured to compute, using metadata 118 received from update manager 110, an order in which the brokers should be updated, wherein the order specifies that the controlling broker will be updated last. Database 108 may be configured to operate as a backend for the container orchestration tool in which clusters 116 run.

Containers 102 form a cluster 116 which, in some embodiments, may manage communications between software and applications. In some embodiments, brokers 102 may be part of a distributed streaming platform. In some embodiments, containers 102 may be Kafka brokers. In some embodiments, containers 102 may be open source. In some embodiments, containers 102 may include brokers 114a, . . . , 114n (114 generally), where containers 102 may support the functionality of software applications, and brokers 114 may possess metadata 118a, . . . , 118n (118 generally). A container packages an entire application in an isolated environment, including all of its dependencies, libraries, and configuration files. This allows the application to run on any computing environment.

Network 106 may include one or more wide area networks (WANs), metropolitan area networks (MANs), local area networks (LANs), personal area networks (PANs), or any combination of these networks. Network 106 may include a combination of one or more types of networks such as Internet, intranet, Ethernet, twisted-pair, coaxial cable, fiber optic, cellular, satellite, IEEE 801.11, terrestrial, and/or other types of wired or wireless networks. Network 106 may also use standard communication technologies and/or protocols.

The various system components—such as modules 110 and 112—may be implemented using hardware and/or software configured to perform and execute the processes, steps, or other functionality in conjunction therewith.

Figure 2A:
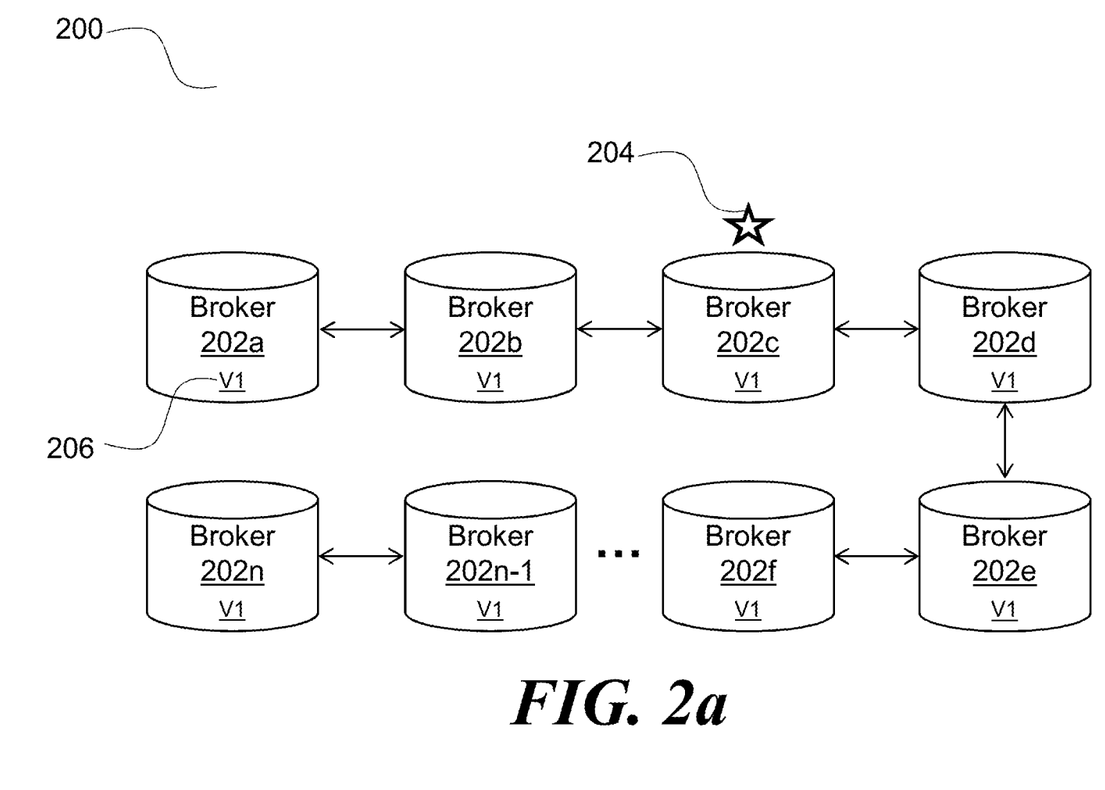
FIGS. 2A, 2B, 2C, and 2D are example schematics of applying rolling updates to a cluster of servers without an intelligent update process.

FIGS. 2A, 2B, 2C, and 2D are example schematics of applying rolling updates to a cluster 200 of brokers 202a, 202b, . . . , 202n (202 generally) without an intelligent update process. FIG. 2A shows the state of the cluster 200 of brokers 202 prior to receiving an update. In some embodiments, cluster 200 may be a cluster within Kafka. In some embodiments, brokers 202 may include containers, although they are not shown here. Each broker may be communicably coupled with every other broker in order to facilitate computation. Each broker 202 within cluster 200 has a label 206 that may denote the current version of each broker. In FIG. 2A, each broker 202 within cluster 200 is version 1 (V1). During a standard method of applying a rolling update to broker cluster 200, each broker 202 may be updated to version 1.2. The order in which the brokers 202 are updated corresponds to the specified order of the brokers 202, 202a→202b→202c→ . . . →202n. In some embodiments, this order may be stored in a StatefulSet in Kubernetes®. Marker 204 may indicate the controlling broker of the cluster 200. In this case, broker 202c is the controlling broker.

Figure 2B:
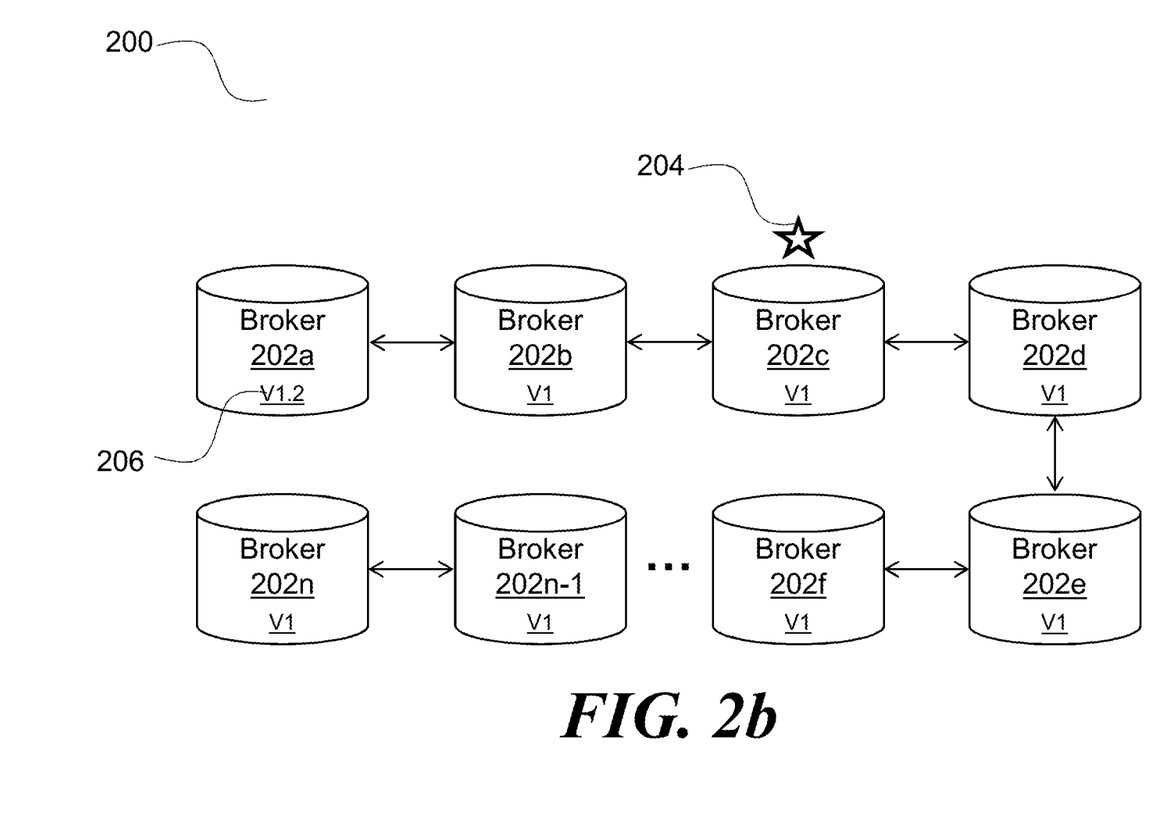

FIG. 2B shows the state of the cluster 200 after broker 202a has been terminated and restarted, and thus updated. The label 206 for broker 202a now indicates that broker 202a has been updated to version 1.2 (V1.2). Broker 202c remains the controlling broker, as demarcated by marker 204. Brokers 202b-202n remain at version 1 (V1).

Figure 2C:
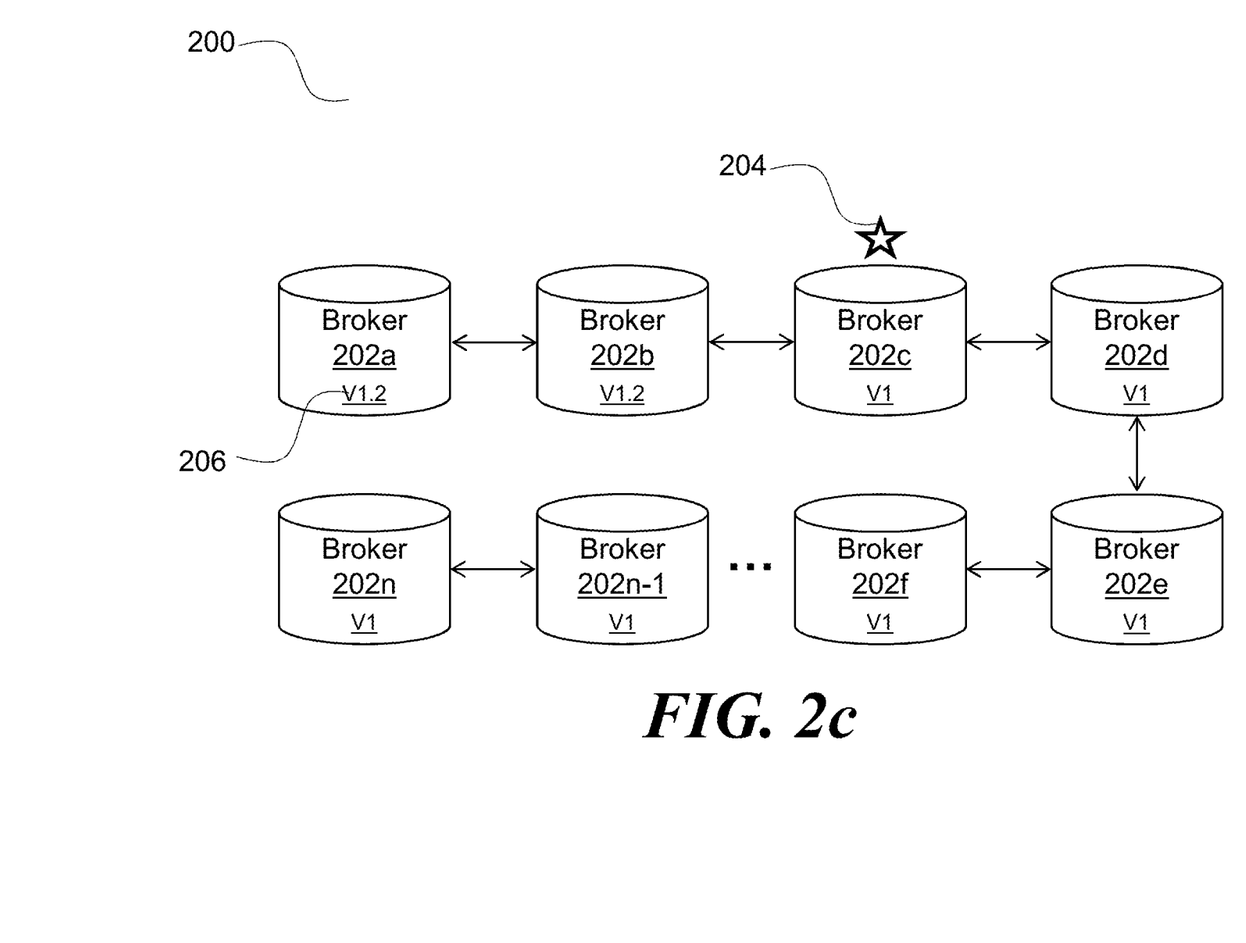

FIG. 2C shows the state of the cluster 200 after broker 202b has been terminated and restarted, and thus updated. The labels 206 now indicate that brokers 202a and 202b have both been updated to version 1.2 (V1.2). Broker 202c remains the controlling broker, as demarcated by marker 204. Brokers 202c-202n remain at version 1 (V1).

Figure 2D:
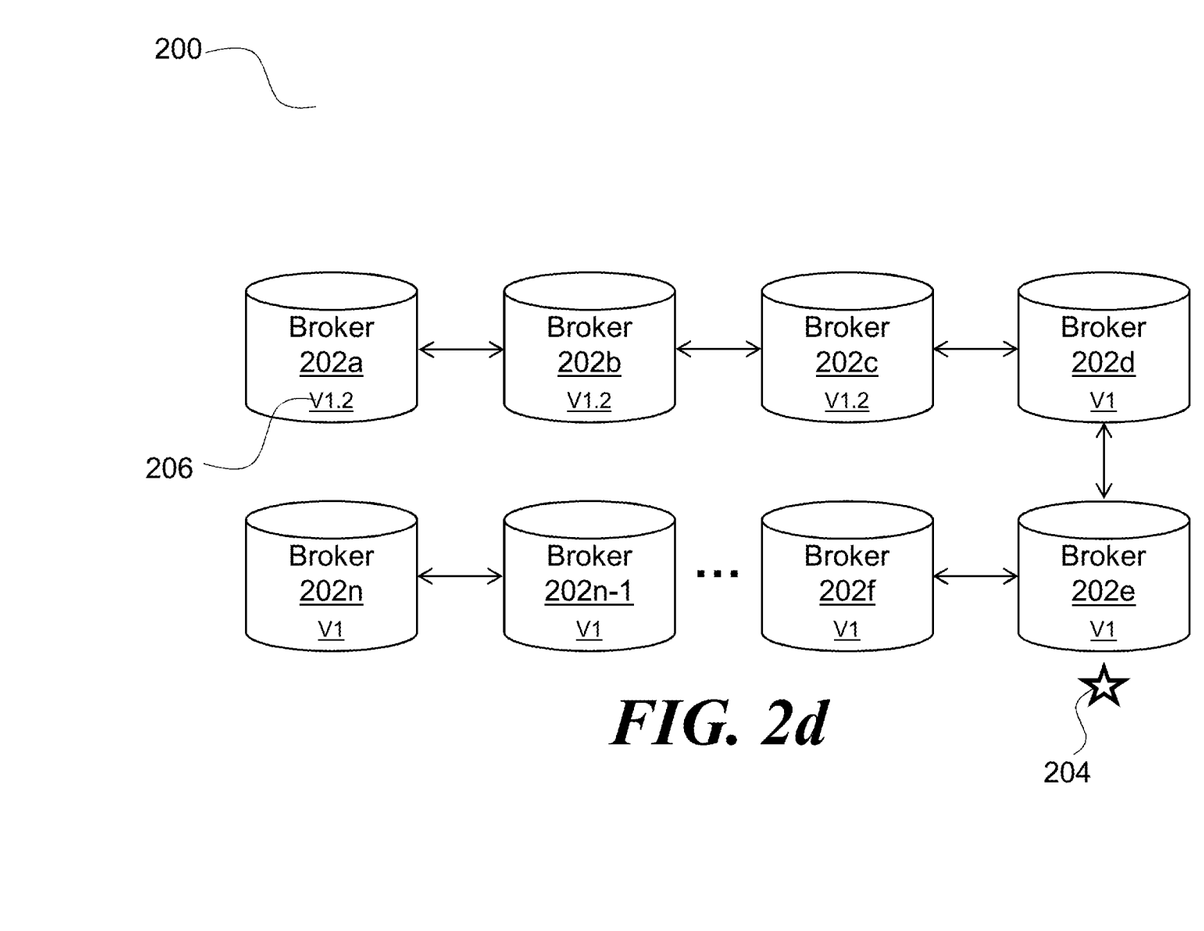

FIG. 2D shows the state of the cluster 200 after broker 202c has been terminated and restarted, and thus updated. The labels 206 now indicate that brokers 202a, 202b, and 202c have all been updated to version 1.2 (V1.2). However, because broker 202c was the controlling broker when it was terminated, a new controlling broker was selected. Broker 202e is now the controlling broker of the cluster, as demarcated by marker 204. Brokers 202d-202n remain at version 1 (V1).

If the remainder of this rolling update were to be carried out, there would be another reselection of the controlling broker when broker 202e is terminated and restarted. When this happens, it is then possible for the next newly selected controlling broker to be a broker still at version 1 (V1) (e.g. 202f, . . . , 202n-1, 202n), leading to yet another reselection of the controlling broker. Repeated reselections of the controlling broker of a cluster of brokers may cause serious degradation in performance.

Figure 3:
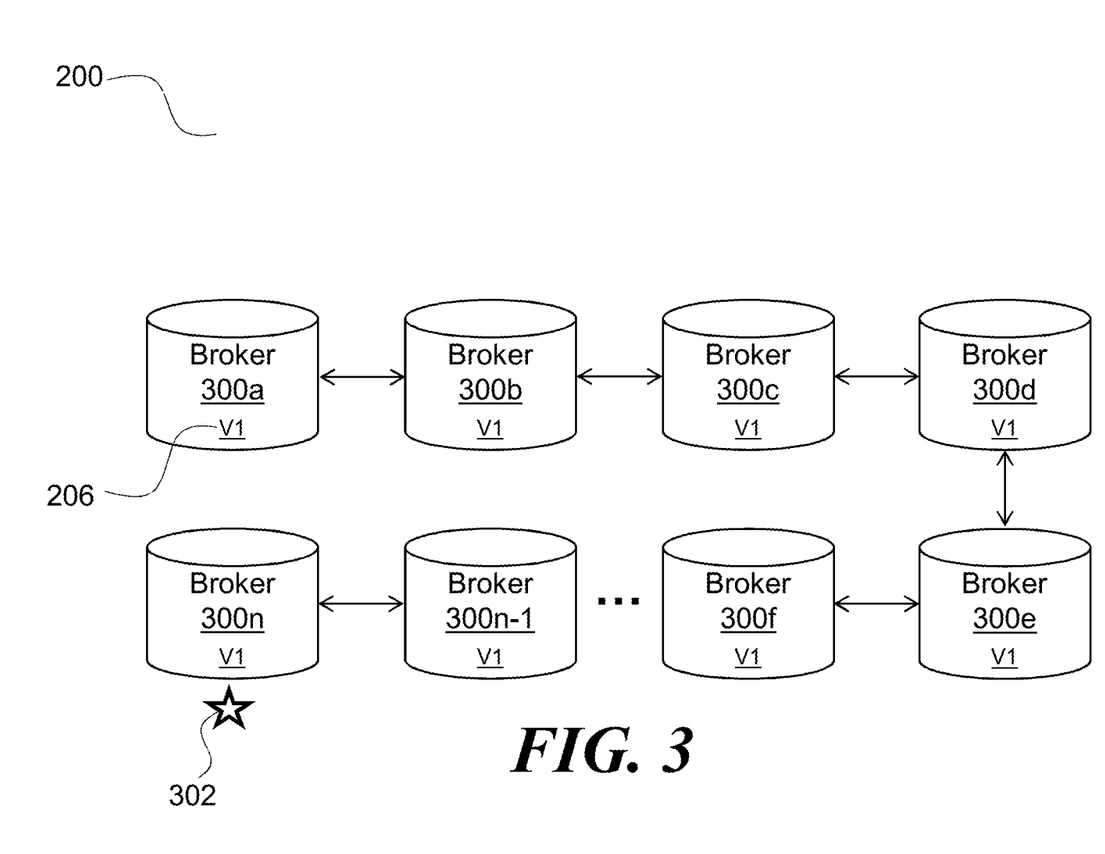
FIG. 3 is an example schematic of performing intelligent rolling updates on a cluster of servers within a container orchestration tool, according to some embodiments of the present disclosure.

FIG. 3 is an illustrative schematic of performing intelligent rolling updates on a cluster 200 of brokers 300a, 300b, . . . , 300n (300 generally), according to some embodiments of the present disclosure. In some embodiments, by taking into account the identities of the brokers 300, including the identity of the controlling broker 300n as demarcated by marker 302, the brokers 300 may be updated in an order, specifying that controlling broker 300n, as demarcated by marker 302, will be updated last. Updating the cluster 200 according to this order may minimize disruption and guarantee a single reselection of the controlling broker.

Figure 4:
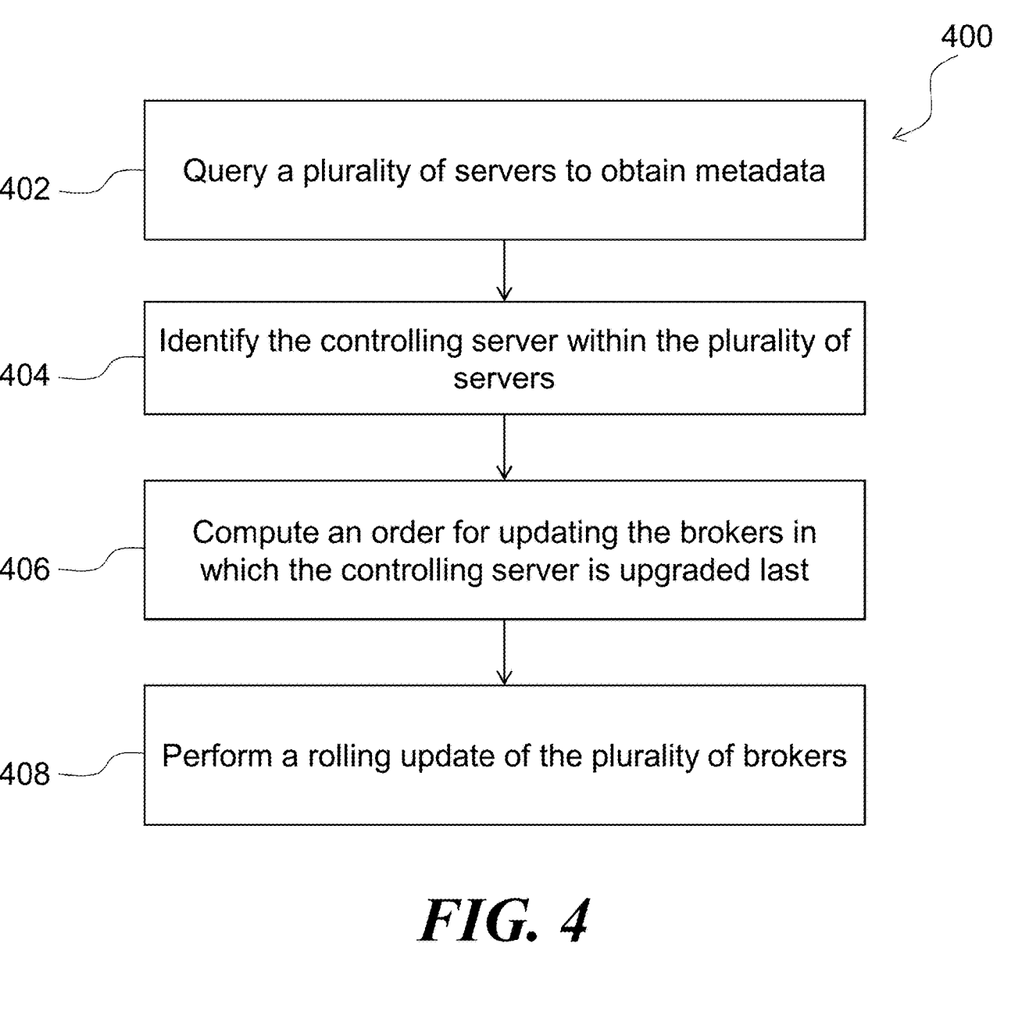
FIG. 4 is a flow diagram showing processing that may occur within the system of FIG. 1, according to some embodiments of the present disclosure.

FIG. 4 is a flow diagram showing process 400 that may occur within the system 100 of FIG. 1, according to some embodiments of the present disclosure. Process 400 may determine the order in which controlling broker 300n is updated last and update brokers 300 accordingly. In some embodiments, prior to performing process 400, update manager 110 may check if updates are available in order to initiate the process. The updates may either be for the cluster or brokers themselves, or for the containers. In some embodiments, github.com may be checked. A public uniform resource locator (URL) (e.g. github.com) may have the latest release version (e.g. v1.2.0) of a broker. The version of the brokers currently installed is stored inside their respective clusters. Update manager 110 may query both of these versions and, in response to determining a difference in versions, may conclude that an update needs to be performed and initiate a rolling update. A similar process may be applied to cluster updates. In some embodiments, a public URL (e.g. github.com) may have the latest version (e.g. v1.2.0) of the cluster that should be running. A version of the cluster that is currently running is stored within the metadata of the cluster. Update manager 110 may query both of these versions and, in response to determining a difference, may conclude that an update needs to be performed and initiate a rolling update of the clusters. In some embodiments, checking may be performed periodically or on every update, or as requested by the user. In some embodiments, server device 104 may perform the checking. In response to determining that any update is available, process 400 may be performed.

At block 402, a plurality of servers (i.e. brokers) 300 within a cluster 200 may be queried to obtain metadata. In some embodiments, the querying may be performed by update manager 110 of FIG. 1. In some embodiments, the containers that are queried may be containers 102. In some embodiments, the obtained metadata may include a StatefulSet that includes the identity of each of the brokers 300. The StatefulSet may also include an identification of the controlling broker within the cluster. In some embodiments, the obtained metadata may include priority data for each of the servers. Priority data may include information on the tasks each broker is assigned to, as well as their importance in relation to each other. Priority data may also include the quantities of data stored in each broker. In some embodiments, the brokers may operate within a distributed streaming platform. In some embodiments, the distributed streaming platform may be Kafka. In some embodiments, the distributed streaming platform may be run on a container orchestration tool, such as Kubernetes® or Docker Swarm®.

At block 404, the controlling broker within the cluster of brokers may be identified. In some embodiments, this identification may be performed using metadata obtained at block 402. In some embodiments, this may be performed by update manager 110. The controlling broker may be identified by analyzing metadata maintained in a database internal to Kafka (or any variety of distributed streaming platforms).

At block 406, an order in which the brokers will be updated in is computed, wherein the order specifies that the controlling broker will be updated last. In some embodiments, computation module 112 may determine the order. In some embodiments, this computation may be performed using the obtained metadata as an input. In some embodiments, order computation module 112 may receive the obtained metadata from update manager 110 and use the metadata to compute the order. In some embodiments, the order may be calculated using an algorithm, or by analyzing the StatefulSet. The algorithm may be based on the obtained metadata, including the identity of the controlling broker and the priority data. For example, brokers that store large amounts of data may be spaced as far apart as possible in the update order to minimize rebalance times while the brokers restart. The algorithm may compute an order in which the controlling broker is updated last, but which also manages the priority levels of the tasks currently assigned to the remaining brokers. This approach may minimize disruption, both by guaranteeing only a single reselection of the controlling broker and by optimally ordering the remainder of the brokers to be updated. In some embodiments, the computed order may be stored in a JSON object.

At block 408, a rolling update to the brokers of the cluster is performed according to the computed order. In some embodiments, this step may be performed by update manager 110. In some embodiments, the brokers may be brokers 114 from FIG. 1. In some embodiments, performing the rolling update may include terminating the broker that is specified as first in the computed order, updating the broker, restarting the broker, and repeating these steps for the remainder of the brokers within the cluster according to the computed order. Updating the broker may include updating existing metadata within the broker to a newer version such that, if any new brokers start, they will employ the new version. In some embodiments, update manager 110 may terminate the brokers by sending a signal to the respective containers to shut down the software being run. The newly updated broker may also be checked to ensure that it is running. In some embodiments, the update may be a new version of the broker software. In some embodiments, the rolling update may update a broker within a container, such as broker 114. In some embodiments, upon completion of the rolling update, each of the brokers within the updated cluster may be checked to confirm it is still running. This step may be performed to confirm a successful rollout of the update. In some embodiments, these checks on the successful operation of the brokers may be performed on each broker individually, after it has been updated.

Figure 5:
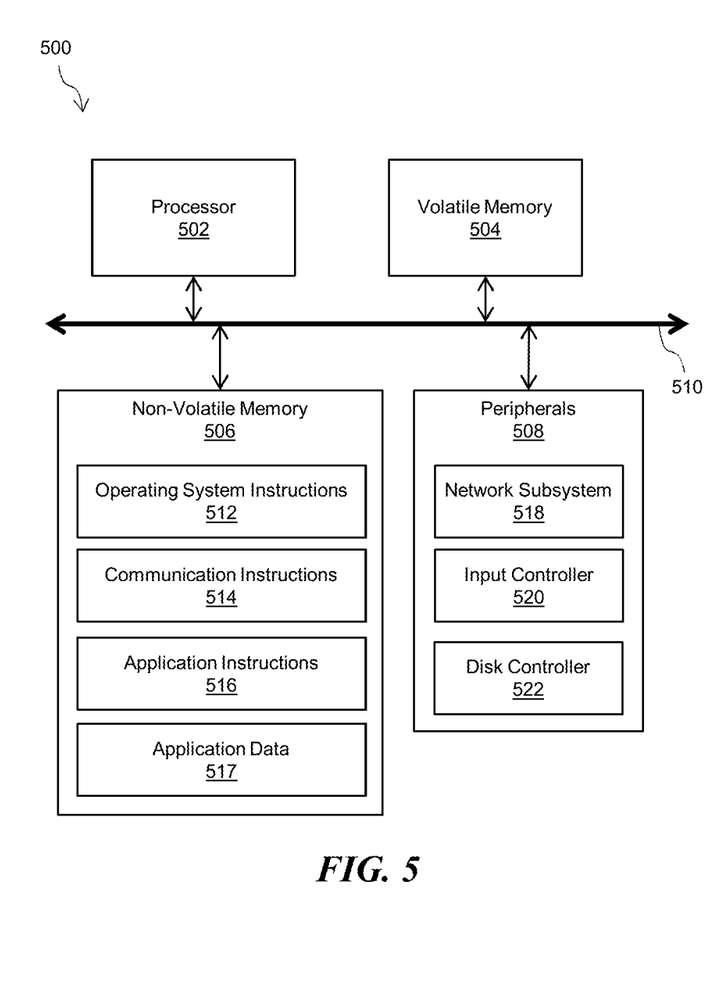
FIG. 5 is an example server device that may be used within the system of FIG. 1, according to some embodiments of the present disclosure.

FIG. 5 is a diagram of an example server device 500 that may be used within system 100 of FIG. 1. Server device 500 may implement various features and processes as described herein. Server device 500 may be implemented on any electronic device that runs software applications derived from complied instructions, including without limitation personal computers, servers, smart phones, media players, electronic tablets, game consoles, email devices, etc. In some implementations, server device 500 may include one or more processors 502, volatile memory 504, non-volatile memory 506, and one or more peripherals 508. These components may be interconnected by one or more computer buses 510.

Processor(s) 502 may use any known processor technology, including but not limited to graphics processors and multi-core processors. Suitable processors for the execution of a program of instructions may include, by way of example, both general and special purpose microprocessors, and the sole processor or one of multiple processors or cores, of any kind of computer. Bus 510 may be any known internal or external bus technology, including but not limited to ISA, EISA, PCI, PCI Express, NuBus, USB, Serial ATA, or FireWire. Volatile memory 504 may include, for example, SDRAM. Processor 502 may receive instructions and data from a read-only memory or a random access memory or both. Essential elements of a computer may include a processor for executing instructions and one or more memories for storing instructions and data.

Non-volatile memory 506 may include by way of example semiconductor memory devices, such as EPROM, EEPROM, and flash memory devices; magnetic disks such as internal hard disks and removable disks; magneto-optical disks; and CD-ROM and DVD-ROM disks. Non-volatile memory 506 may store various computer instructions including operating system instructions 512, communication instructions 514, application instructions 516, and application data 517. Operating system instructions 512 may include instructions for implementing an operating system (e.g., Mac OS®, Windows®, or Linux). The operating system may be multi-user, multiprocessing, multitasking, multithreading, real-time, and the like. Communication instructions 514 may include network communications instructions, for example, software for implementing communication protocols, such as TCP/IP, HTTP, Ethernet, telephony, etc. Application instructions 516 may include instructions for performing intelligent rolling updates on a cluster of servers according to the systems and methods disclosed herein. For example, application instructions 516 may include instructions for components 110-112 described above in conjunction with FIG. 1. Application data 517 may include data corresponding to 108-112 described above in conjunction with FIG. 1.

Peripherals 508 may be included within server device 500 or operatively coupled to communicate with server device 500. Peripherals 508 may include, for example, network subsystem 518, input controller 520, and disk controller 522. Network subsystem 518 may include, for example, an Ethernet of WiFi adapter. Input controller 520 may be any known input device technology, including but not limited to a keyboard (including a virtual keyboard), mouse, track ball, and touch-sensitive pad or display. Disk controller 522 may include one or more mass storage devices for storing data files; such devices include magnetic disks, such as internal hard disks and removable disks; magneto-optical disks; and optical disks.

The implementations described herein are primarily described in the context of running Kafka on Kubernetes®. However, the implementations described herein are not limited to those involving Kafka and/or Kubernetes®, and may be applied with regard to any similar distributed streaming platforms or container orchestration tools and their combination thereof.

While various embodiments have been described above, it should be understood that they have been presented by way of example and not limitation. It will be apparent to persons skilled in the relevant art(s) that various changes in form and detail may be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

The invention claimed is:

1. A method for automatically updating a plurality of brokers in a cluster of a distributed streaming platform within a container orchestration tool comprising:
querying, via an update manager executed by at least one processor, a StatefulSet that maintains each of a plurality of brokers to obtain metadata from a distributed streaming platform, the container orchestration tool being configured to orchestrate the distributed streaming platform and each of the plurality of brokers being configured to communicate via the distributed streaming platform;
using the obtained metadata, via the update manager, to identify a broker within the plurality of brokers that acts as a controlling broker;
computing, via the update manager, an order in which the plurality of brokers will be updated based on the obtained metadata, wherein the order specifies that the controlling broker will be updated last, wherein computing the order comprises:
identifying a first broker that stores a largest amount of data;
identifying a second broker that stores a second largest amount of data; and
computing the order such that a period of time between updates of the first broker and the second broker is maximized; and
performing, via the update manager, a rolling update of each of the plurality of brokers according to the computed order.

2. The method of claim 1 comprising, upon completion of the rolling update, checking, via the update manager, that each of the plurality of brokers is running.

3. The method of claim 1, comprising:
checking, via the update manager, if a new version of the distributed streaming platform is available to download for the plurality of brokers; and
in response to determining that the new version is available, executing steps of the querying, the using, the computing, and the performing.

4. The method of claim 3, wherein the checking comprises a public uniform resource locator (URL).

5. The method of claim 1 wherein performing the rolling update comprises:
terminating a beginning broker of the plurality of brokers according to the computed order;
updating existing metadata within the beginning broker to a newer version;
restarting the beginning broker; and
repeating steps of the terminating, the updating, and the restarting for each successive broker according to the computed order until each broker of the plurality of brokers has been updated.

6. The method of claim 1, wherein the obtained metadata comprises:
an identity of each of the plurality of brokers;
the identity of the controlling broker; and
priority data for each of the plurality of brokers.

7. The method of claim 1, wherein the order in which the plurality of brokers will be updated is computed based at least in part on amounts of data handled by each of the plurality of brokers.

8. The method of claim 1, wherein the computed order in which the plurality of brokers will be updated is contained in a JSON object.

9. A method for automatically updating a plurality of brokers in a cluster of a distributed streaming platform within a container orchestration tool comprising:
obtaining metadata for a plurality of brokers within a container from a StatefulSet that maintains the plurality of brokers, the container orchestration tool being configured to orchestrate the distributed streaming platform and each of the plurality of brokers being configured to communicate via the distributed streaming platform;

sending, by the container executed by at least one processor, the metadata for a plurality of brokers within the container to a server, wherein the metadata is used to identify a broker within the plurality of brokers that acts as a controlling broker;

receiving, by the container, rolling updates for the plurality of brokers from the server, the updates being applied in an order computed using the obtained metadata, wherein the order specifies that the controlling broker will receive an update last, wherein the order further specifies that a period of time between updates of a first broker and a second broker is maximized, the first broker storing a largest amount of data and the second broker storing a second largest amount of data; and applying, by the container, the rolling updates to the plurality of brokers according to the order.

10. The method of claim 9 comprising, upon completion of the rolling updates, receiving, by the container, a check that each of the plurality of brokers is running.

11. The method of claim 9, wherein receiving the rolling updates comprises:
receiving, by the container, a signal to terminate a beginning broker of the plurality of brokers according to the computed order;
receiving, by the container, updates to existing metadata within the beginning broker;
receiving, by the container, a signal to restart the beginning broker; and
receiving, by the container, a signal to terminate, updates to metadata, and a signal to restart for each successive broker according to the computed order until each broker of the plurality of brokers has been updated.

12. The method of claim 9, wherein the sent metadata comprises:
an identity of each of the plurality of brokers;
the identity of the controlling broker; and
priority data for each of the plurality of brokers.

13. The method of claim 9, wherein the order in which the plurality of brokers will be updated is computed based at least in part on amounts of data handled by each of the plurality of brokers, via the server.

14. A system for automatically updating a plurality of brokers in a cluster of a distributed streaming platform within a container orchestration tool comprising:
a cluster of containers, each container including a plurality of brokers;
a server device comprising at least one processor; and
a non-transitory computer-readable medium comprising instructions stored thereon which, when executed by the server device, cause the at least one processor to execute a process operable to:
query, via an update manager executed by the at least one processor, a StatefulSet that maintains each of the plurality of brokers to obtain metadata from a distributed streaming platform, the container orchestration tool being configured to orchestrate the distributed streaming platform and each of the plurality of brokers being configured to communicate via the distributed streaming platform;
use the obtained metadata, via the update manager, to identify a broker within the plurality of brokers that acts as a controlling broker;
compute, via the update manager, an order in which the plurality of brokers will be updated based on the obtained metadata, wherein the order specifies that the controlling broker will be updated last, wherein computing the order comprises:
identifying a first broker that stores a largest amount of data;
identifying a second broker that stores a second largest amount of data; and
computing the order such that a period of time between updates of the first broker and the second broker is maximized; and
perform, via the update manager, a rolling update of each of the plurality of brokers according to the computed order.

15. The system of claim 14, wherein the non-transitory computer-readable medium comprises instructions that, when executed by the at least one processor, cause the at least one processor to, upon completion of the rolling update, check that each of the plurality of brokers is running.

16. The system of claim 14, wherein the non-transitory computer-readable medium comprises further instructions that, when executed by the at least one processor, cause the at least one processor to:
check if a new version of the distributed streaming platform is available to download for the plurality of brokers; and
in response to determining that the new version is available, execute steps of the querying, the using, the computing, and the performing.

17. The system of claim 14, wherein performing the rolling update comprises:
terminating a beginning broker of the plurality of brokers according to the computed order;
updating existing metadata within the beginning broker to a newer version;
restarting the beginning broker; and
repeating steps of the terminating, the updating, and the restarting for each successive broker according to the computed order until each broker of the plurality of brokers has been updated.

18. The system of claim 14, wherein the obtained metadata comprises:
an identity of each of the plurality of brokers;
the identity of the controlling broker; and
priority data for each of the plurality of brokers.

19. The system of claim 14, wherein the order in which the plurality of brokers will be updated is computed based at least in part on amounts of data handled by each of the plurality of brokers via the server device.

* * * * *